UNITED STATES PATENT OFFICE 1,934,977

MEDICINAL PREPARATION

Charles Gurchot, San Mateo, Calif.

No Drawing. Application November 14, 1931
Serial No. 575,147

5 Claims. (Cl. 167—72)

My invention relates to medicines against spirochetal diseases and consists in the use of electronegative radicals in such medicines. More in particular, it consists in the use of compounds containing an electro-negative radical comprising arsenic, mercury or bismuth combined with a neurotropic anion as thiocyanate, iodide or bromide as a remedy against spirochetal diseases, particularly syphilis.

It is an object of my invention to provide a spirocheticidal medicinal preparation which will readily enter the central nervous system after injection.

It is well known that in these diseases the spirochetes may occur all through the central nervous system and are not confined to any particular part thereof. The customary way at present to treat these diseases, particularly syphilis, consists in the intravenous or intramuscular injection of metallic protoplasmic poisons, usually arsenic, mercury or bismuth compounds. The difficulty with these treatments is that the compounds generally used do not readily penetrate into the central nervous system and therefore, their effect is more or less restricted.

I have found that an electro-negative radical will readily penetrate the central nervous system and diffuse speedily throughout the entire organism, and I use this property to introduce and diffuse the metallic poisons. As such electronegative radicals I prefer to use a complexion or double anion containing these metallic protoplasmic poisons, the other component of the radical being an electronegative neurotropic radical, preferably thiocyanate, iodide or bromide, though nitrates and chlorides can also be used. For simplicity I use in this description of my invention and the claims the term "neurotropic radical" to indicate those radicals or anions which have the property of readily dispersing proteins and lipoids, including in this term the radicals and groups of radicals enumerated here and below and such others as show this property to a sufficient extent. Without binding myself or limiting my invention, I attribute the good results obtained with my preparation to the dispersing properties of these radicals, which enable the compound to quickly penetrate the central nervous system and diffuse itself entirely through it. Further, these compounds in which the metal is held in an electro-negative radical are not stable but probably begin to decompose quickly after having diffused, liberating the spirocheticidal positive metal which then in nascent state is most effective on the spirochetes; in its electro-negative state the metal probably has little or no effect on them.

To make up my preparation, I combine these negative radicals with those positive radicals which are least harmful to body tissues, preferably sodium or ammonium. These compounds I dissolve in any of the usual solvents, generally alcohols, as mono-di- and trihydric alcohols, their derivatives or substitution products as glycols or glycerols; for instance, I have used ethylene glycol and diethylene glycol with good results.

To give a specific example of a compound I have used and its preparation, without limiting myself to this compound or any of the details of preparation, I have obtained excellent results with sodium iodo arsenite $(MaAsI_4)$, dissolved in di-ethylene glycol. To prepare this I have dissolved 20 grams of arsenious iodide and 100 grams of sodium iodide in one liter of the solvent; the solution will change color and a clear red liquid will be obtained, which is the preparation of my invention. Many other methods of preparing this compound, however, are possible.

Regarding the concentrations mentioned, it will be clear that these can be varied; for instance, I can use from 20 to 50 grams of arsenious iodide and 100 to 200 grams of sodium iodide. The solution must be strong enough to be effective in destroying the spirochetes and not too strong to be too irritating or harmful to the body tissues.

The stability of the compounds of my invention must be sufficient to prevent decomposition before they are well distributed. I have found that an excess of the salt used to re-act with the original simple compound containing the spirocheticidal metal tends to stabilize the new compounds and up to certain limits increases their effect. In preparing the solution of sodium iodo arsenite mentioned above, I preferably add about 10% excess sodium iodide, which increases the stability sufficiently to obtain better diffusion without decreasing the spirocheticidal effect by too great stability; as mentioned before, only on or after decomposition will the metal be effective.

In preparing the compounds of my invention, I have little preference between the thiocyanates, iodides or bromides; the thiocyanates may have somewhat better penetrating effect, the iodides are somewhat easier to prepare, the bromides may have a slight sedative effect.

I could also use other neurotropic radicals, as nitrates, chlorides, sulphates, acetates or oxides (as $As_2O_3$), but most of these are more expensive to use, are too strong or usually contain some free acid often formed by hydrolysis upon exposure to air (as HCL in the chlorides); the iodides are free from this difficulty. Therefore, though my invention can be carried out with these compounds I preferably use the first mentioned salt.

I have prepared and used many compounds according to my invention besides sodium iodo arsenite mentioned above. For instance, I have used ammonium iodo mercuriate, sodium iodo mercuriate and potassium iodo mercuriate, sodium thiocyano bismuthite, sodium bromo bismuthite, sodium nitro bismuthite and sodium chloro bismuthite. I have also found that sodium bismuthate and ammonium bismuthate can be used according to the principle of my invention and behave similarly as the before mentioned compounds, the bismuthate being the electro-negative radical which decomposes.

As examples of spirochetal diseases I may mention besides syphilis, recurrent fever and yaws.

I have incidentally found that the unstable electro-negative arsenicals have great therapeutic value against Vincent's angina or trench-mouth (not entirely a spirochetal disease) pyorrhea, stomatitis and similar diseases. Without having verified it, I attribute their better effect over the ordinary compounds to their unstable electro-negative character. I have used especially sodium and potassium iodo arsenite very successfully in severe cases of Vincent's angina. For this use by local application in the mouth the potassium salts are not toxic. For these diseases bismuth compounds are not effective, mercury compounds are less effective.

For the compounds of my invention, besides the three spirocheticidal metals mentioned, arsenic, mercury and bismuth, others of the fifth group may also be used, as antimony or vanadium.

It will be understood that besides ammonium, sodium and potassium and their compounds, I can also use other positive radicals within the scope of my invention; the main requirement is that they are not too toxic to body tissues. For instance, lithium compounds can also be used.

I claim as my invention:

1. As a medicinal preparation against Vincent's angina: a compound comprising a positive radical of limited toxicity to body tissues and an electro-negative radical containing a neurotropic ion and an arsenite.

2. As a medicinal preparation against Vincent's angina: a compound comprising an alkali metal ion combined with a double anion of a halide and arsenic.

3. A medicinal preparation against Vincent's angina, as described in claim 1 in which the positive radical comprises a radical of the alkali metals.

4. A medicinal preparation against Vincent's angina as described in claim 1 in which the positive radical comprises sodium or potassium.

5. As a medicinal preparation against Vincent's angina: sodium iodoarsenite.

CHARLES GURCHOT.